United States Patent
Trinschek et al.

(10) Patent No.: US 9,345,076 B2
(45) Date of Patent: May 17, 2016

(54) MULTI-COLOR LIGHT UNIT AND PASSENGER TRANSPORT VEHICLE COMPRISING THE SAME

(71) Applicant: Goodrich Lighting Systems GmbH, Lippstadt (DE)

(72) Inventors: Robert Trinschek, Hamm (DE); Frederik Kraemer, Hirschberg (DE); Tomasz Kordecki, Hamm (DE)

(73) Assignee: GOODRICH LIGHTING SYSTEMS GMBH (DE)

( * ) Notice: Subject to any disclaimer, the term of this patent is extended or adjusted under 35 U.S.C. 154(b) by 0 days.

(21) Appl. No.: 14/660,594

(22) Filed: Mar. 17, 2015

(65) Prior Publication Data
US 2015/0271881 A1 Sep. 24, 2015

(30) Foreign Application Priority Data
Mar. 18, 2014 (EP) .................................. 14160545

(51) Int. Cl.
*H05B 33/08* (2006.01)
*B60Q 3/02* (2006.01)

(52) U.S. Cl.
CPC .......... *H05B 33/0806* (2013.01); *B60Q 3/0293* (2013.01); *H05B 33/0827* (2013.01)

(58) Field of Classification Search
None
See application file for complete search history.

(56) References Cited

U.S. PATENT DOCUMENTS

| | | | |
|---|---|---|---|
| 2009/0153066 A1 | 6/2009 | Yang et al. | |
| 2010/0109537 A1* | 5/2010 | Nishino et al. | 315/185 R |
| 2012/0200229 A1* | 8/2012 | Kunst et al. | 315/186 |
| 2012/0235574 A1* | 9/2012 | Sumi et al. | 315/131 |
| 2013/0322059 A1 | 12/2013 | Gao et al. | |

OTHER PUBLICATIONS

European Search Report Application No. 14160545.1-1802, Mailed on Sep. 29, 2014, 4 Pages.

* cited by examiner

*Primary Examiner* — Douglas W Owens
*Assistant Examiner* — Dedei K Hammond
(74) *Attorney, Agent, or Firm* — Cantor Colburn LLP

(57) ABSTRACT

A multi-color light unit includes a plurality of lighting circuits, with each lighting circuit being coupled to a joint power terminal. The plurality of lighting circuits include a first lighting circuit, which includes a first current source, coupled to the joint power terminal, a plurality of first LED's, in operation emitting light of a first color, and a plurality of voltage drop diodes, in operation not emitting light, the plurality of first LED's and the plurality of voltage drop diodes being coupled to the first current source. The plurality of lighting circuits further include a second lighting circuit, which includes a second current source, coupled to the joint power terminal, and a plurality of second LED's, in operation emitting light of a second color, the plurality of second LED's being coupled to the second current source. The first current source and the second current source are of equal design.

16 Claims, 1 Drawing Sheet

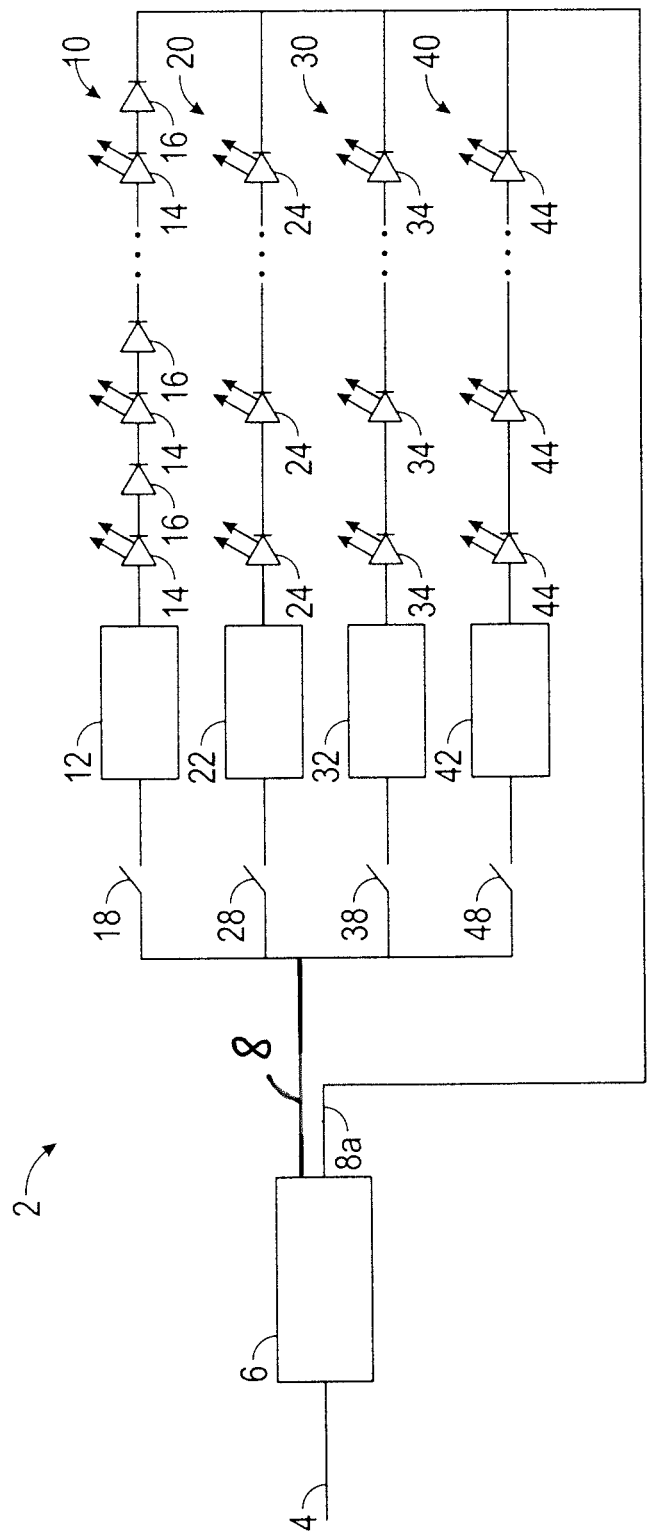

MULTI-COLOR LIGHT UNIT AND PASSENGER TRANSPORT VEHICLE COMPRISING THE SAME

FOREIGN PRIORITY

This application claims priority to European Patent Application No. 14 160 545.1 filed Mar. 18, 2014, the entire contents of which is incorporated herein by reference.

TECHNICAL FIELD

The invention relates to lighting systems used in the interior of passenger transport vehicles. In particular, it relates to multi-color light units to be used in passenger transport vehicles.

BACKGROUND

Almost all passenger transport vehicles have interior lights. Such lights are on the one hand provided for the general illumination of the vehicle. On the other hand, they are provided for signalling purposes to the passengers. In the example of an aircraft, such signalling lights may be used for emergency lighting and other purposes. For both of these application scenarios, LED light units are becoming more and more common. Also, light units exist that have LED's of various colors. This allows for illumination in different colors at different points in time and/or color mixing for reaching a desired shade of a particular color.

The power conditioning in current LED light units with multiple color LED's is not satisfactory. LED light units commonly need some form of power conditioning to transform the power received from a power supply, such as an on board power supply network in the case of an aircraft, into power suitable to drive the LED's. Previous approaches of power conversion either suffered from large complexity or generated undesirable amounts of heat.

Accordingly, it would be beneficial to provide a multi-color light unit that allows for a reduction in heat generation in the power conditioning portion, while at the same time allowing for low complexity thereof. Further, it would be beneficial to provide a passenger transport vehicle with such improved multi-color light unit.

SUMMARY

Exemplary embodiments of the invention include a multi-color light unit that comprises a plurality of lighting circuits, with each lighting circuit being coupled to a joint power terminal. The plurality of lighting circuits comprise a first lighting circuit, comprising a first current source, coupled to the joint power terminal, a plurality of first LED's, in operation emitting light of a first color, and a plurality of voltage drop diodes, in operation not emitting light, the plurality of first LED's and the plurality of voltage drop diodes being coupled to the first current source. The plurality of lighting circuits further comprise a second lighting circuit, comprising a second current source, coupled to the joint power terminal, and a plurality of second LED's, in operation emitting light of a second color, the plurality of second LED's being coupled to the second current source. The first current source and the second current source are of equal design.

The voltage drop diodes are provided for conditioning the overall voltage drop of the diodes in the first lighting circuit, i.e. of the first LED's and the voltage drop diodes in the first lighting circuit. Providing the voltage drop diodes in the first lighting circuit constitutes a way of assimilating the electric behavior of the diode strings in the first and second lighting circuits. Stated differently, the power consumption characteristics, i.e. the current and voltage behavior, of the circuitry "downstream" of the current sources in the individual lighting circuits can be made similar by providing the voltage drop diodes. Due to the assimilated electric behavior in the diode strings, identical current sources are ideally suited. They can be connected to the same power terminal, i.e. to the joint power terminal, without one of the current sources generating large amounts of waste heat.

The two lighting circuits, which are coupled to the same power terminal and therefore receive the same voltage in operation and which have the same current flowing therethrough due to the identical current sources, dissipate the same amount of electric power. With the diode strings in the first and second lighting circuits having similar overall electric characteristics and therefore dissipating similar amounts of power, the first and second current sources also dissipate a similar amount of power. Accordingly, both current sources operate in a similar usage scenario. The same circuit structure is chosen for the first and second current sources. In this way, only one kind of current source is needed, which leads to low complexity during all of the design, assembly, use and maintenance phases of the light unit. As the design of the two current sources may be adapted to one particular usage scenario, the current sources may be designed to generate little waste heat at that usage scenario, such that no concentrated heat generation takes place at the positions of the current sources.

In contrast thereto, if the circuit structure of the multi-color light unit were provided without the plurality of voltage drop diodes, the electric behavior between the diode strings of the first and second lighting circuits could be very different. When using the same current source in both lighting circuits, one of those current sources would generate additional waste heat that corresponds to the difference in electric power consumption between the diode strings in the first and second lighting circuits. This concentrated waste heat generation can be prevented by the present invention. Using different current sources could reduce the generation of waste heat, but would lead to a higher complexity. This increase in complexity would not only be reflected in the need for designing and assembling different current sources. The current sources would also have to be controlled differently, e.g. during a dimming operation, leading to an overall more complex system on many levels.

The inventive circuit structure of the multi-color light unit leads on the one hand to low waste heat generation in the current sources. In this way, no localized heat peaks are present within the light unit that would have to be cooled with extensive cooling measures, which in turn would consume power. On the other hand, the focus on current sources of one design allows for the usage of smaller and cheaper current sources with improved dimming characteristics as compared to the prior art.

In the multi-color light unit, the combined forward voltage drop of the plurality of first LED's, emitting light of the first color, is different from the combined forward voltage drop of the plurality of second LED's, emitting light of the second color. In particular, the combined forward voltage drop of the plurality of first LED's is smaller than the combined forward voltage drop of the plurality of second LED's. This may have a number of reasons. A first reason is that the individual LED's of different colors may have different forward voltage drops. Accordingly, providing the same number of LED's of different colors in series may result in significantly different forward voltage drops. Another reason is that the intensity of the first color may be desired to be lower than the intensity of the second color. Accordingly, the first lighting circuit may, by design, have a lower number of LED's than the second lighting circuit, leading to significantly different forward voltage drops. It is this difference in the combined forward voltage drop of the LED's in the first and second lighting circuits that the voltage drop diodes mitigate, at least to some extent, leading to above discussed advantages with respect to the power conditioning.

The term current source does not refer to an original generator of electric energy. Rather, the term current source refers to a circuit structure that is provided with electric power at its input, i.e. at the joint power terminal in the present case, and provides a controlled current at its output, i.e. at the coupling to the diodes of the respective lighting circuit in the present case.

The term voltage drop diode, not emitting light in operation, refers to a diode that has a forward voltage drop, when current is flown therethrough, and that has no capability of emitting light. In other words, a voltage drop diode in the sense of the invention may be any sort of diode that does not emit light, in particular a standard diode. It may also be referred to as non-light emitting diode.

The term of equal design indicates that the first current source and the second current source are nominally identical. In other words, the first and second current sources comprise the same circuit elements arranged in an identical manner. Due to production tolerances and other imperfections, the electric behavior of the first and second current sources will probably not be entirely identical. Accordingly, the term of equal design refers to circuits with substantially analogous behavior.

The term in operation refers to the situation where the current source supplies the nominal current to the respective lighting circuit. In other words, an operation is ongoing when current is flown through the respective lighting circuit in such a way that the LED's of the respective color light up. It is pointed out that the term operation does not require that current is flown though all lighting circuits. In particular, it is possible that different subsets of the lighting circuits are switched on during different modes of operation. In this way, the light unit may be used for different application scenarios. Accordingly, it is possible that each lighting circuit comprises an on/off switch that can be switched between an open and a closed state.

The term diode string is used to describe the set of all diodes of a lighting circuit, no matter if they are LED's or voltage drop diodes. The term does not specify if the diodes are connected in series or in parallel or in a combination of a series and parallel arrangement.

According to a further embodiment, the plurality of first LED's and the plurality of voltage drop diodes of the first lighting circuit form a first series connection. In other words, the plurality of first LED's and the plurality of voltage drop diodes are connected in series. It is pointed out that the order of the series connection is irrelevant, as it leads to the same electric behavior. The term series connection includes any kind of order among the first LED's and the voltage drop diodes. By providing a series connection, it is ensured that the controlled current from the first current source is flown through each of the first LED's and the voltage drop diodes. In this way, each of these diodes has a well-defined electric behavior, leading to a well-defined overall illumination by the first LED's and a well-defined overall voltage drop of the diodes of the first lighting circuit. In a particular embodiment, the voltage drop diodes are distributed over an extended portion of the first lighting circuit. In this way, the waste heat generation by the voltage drop diodes is distributed as well.

According to a further embodiment, the plurality of second LED's of the second lighting circuit form a second series connection. In other words, the plurality of second LED's are connected in series. By providing a series connection, it is ensured that the controlled current from the second current source is flown through each of the second LED's. In this way, each of these diodes has a well-defined electric behavior, leading to a well-defined overall illumination by the second LED's and a well-defined overall voltage drop of the second LED's of the second lighting circuit.

According to a further embodiment, the second lighting circuit is free of voltage drop diodes, which in operation do not emit light. In other words, no non-light emitting diodes are contained in the second lighting circuit. In this way, the electric energy available in the second lighting circuit is used completely for producing illumination, resulting in high energy-efficiency. Only the first lighting circuit has voltage drop diodes that are provided for conditioning the overall voltage drop of the first lighting circuit, which allows for an assimilation of the electric behavior of the first and second lighting circuits.

According to a further embodiment, the first color is red. Common red LED's have a forward voltage drop that is lower than that of common LED's of other colors. In particular, a red LED may in operation have a forward voltage drop of between 1.4 V and 1.8 V, in particular of around 1.6 V. As compared to other color LED's, which may have a forward voltage drop of between 2.5 V and 4.0 V, in particular of between 3.0 V and 3.5 V. The lower forward voltage drop of each red LED results in a significantly lower overall forward voltage drop of the first lighting circuit. This is compensated in part or entirely by the provision of the plurality of voltage drop diodes.

According to a further embodiment, the second color is one of the group consisting of green, blue, white and amber white. Common LED's of green, blue, white and amber white colors may in operation have a forward voltage drop of between 2.5 V and 4.0 V, in particular of between 3.0 V and 3.5 V. The term amber white refers to a shade of white that is warmer than standard white light and that is therefore often used in interior lighting.

According to a further embodiment, the number of voltage drop diodes in the first lighting circuit is chosen in such a way that the joint forward voltage drop of the first LED's and the voltage drop diodes in the first lighting circuit in operation is between 80% and 120% of the joint forward voltage drop of the second LED's in the second lighting circuit in operation. The joint forward voltage drop of the first LED's and the voltage drop diodes in the first lighting circuit may in particular be between 90% and 110% of the joint forward voltage drop of the second LED's in the second lighting circuit. In this way, the electric behavior of the first and second lighting circuits may be particularly well-matched, such that above described advantages with respect to low complexity and little waste heat generation in the first and second current sources are achieved particularly well.

According to a further embodiment, the first current source and the second current source are linear current sources. Linear current sources are current sources that do not contain active or switched elements. Linear current sources are comparably small, cheap and have good dimming properties, e.g. via adjustable resistors. In this way, linear current sources of equal design allow for a particularly low complexity of the power conditioning portion of the multi-color light unit.

According to a further embodiment, the number of first LED's is between 80% and 120% of the number of second LED's. In particular, the number of first LED's may be between 90% and 110% of the number of second LED's. Further in particular, the number of first LED's may be the same as the number of second LED's. In this way, comparable intensity levels between the different colors may be achieved. Also, dimming operations may have comparable effects in terms of the intensity reduction in both the first and second lighting circuit.

According to a further embodiment, the number of first LED's and the number of second LED's is between 10 and 50, respectively. In a particular embodiment, the number of first LED's and the number of second LED's depends on the length of the multi-color light unit. In a further particular embodiment, one LED of each color is provided for every 20-40 mm, in particular for every about 30 mm of the multi-color light unit.

According to a further embodiment, the power consumption of the multi-color light unit is between 10 W and 20 W per meter (of the length of the light unit), in particular around 15 W per meter.

According to a further embodiment, the multi-color light unit further comprises a power input terminal connectible to an external power supply and a power conditioning module, the power conditioning module being coupled between the power input terminal and the joint power terminal. The multi-color light unit may be coupled to an external power source, such as the on board power supply system of an aircraft, via the power input terminal. The power input terminal may be an AC terminal. The joint power terminal may be a DC terminal. The power conditioning module may comprise one or more of a DC/AC converter, a power factor control circuit, and a DC/DC converter. In this way, a suitable voltage point may be provided at the joint power terminal, from which the current sources draw power.

According to a further embodiment, the multi-color light unit further comprises a third lighting circuit, comprising a third current source, coupled to the joint power terminal, and a plurality of third LED's, in operation emitting light of a third color, the plurality of third LED's being coupled to the third current source, wherein the third current source is of equal design as the first and second current sources. The third lighting circuit may be configured in a manner analogous to the second lighting circuit. In particular, it may be free of voltage drop diodes. In general, the third lighting circuit may have one or more or all of the other features laid out above with respect to the second lighting circuit. In the alternative, the third lighting circuit may be configured in a manner analogous to the first lighting circuit. In particular, it may comprise a plurality of voltage drop diodes. Further in particular, the number of voltage drop diodes in the third lighting circuit may be chosen in such a way that the joint forward voltage drop of the third LED's and the voltage drop diodes in the third lighting circuit in operation may be between 80% and 120%, in particular between 90% and 110%, of the joint voltage drop of the second LED's in the second lighting circuit. In general, the third lighting circuit may have one or more or all of the other features laid out above with respect to the first lighting circuit. In this way, three lighting circuits with comparable electric behavior in the respective diode strings may be provided. Thus, a light unit with three colors may be operated with three current sources of identical design, which further extends above described advantages.

According to a further embodiment, the first color is red and the second and third colors are green and blue. An RGB light unit with above described properties is achieved in this way. In the alternative, the first color may be red and the second and third colors may be white and amber white. A WAWR light unit, allowing for the provision of a particularly warm shade of white, with above described properties is achieved in this way.

According to a further embodiment, the multi-color light unit further comprises a fourth lighting circuit, comprising a fourth current source, coupled to the joint power terminal, and a plurality of fourth LED's, in operation emitting light of a fourth color, the plurality of fourth LED's being coupled to the fourth current source, wherein the fourth current source is of equal design as the first, second and third current sources. All considerations given above with respect to the particular features of the third lighting circuit equally apply to the fourth lighting circuit. In this way, a light unit may be provided where four individual lighting circuits are provided with respectively appropriate numbers of voltage drop diodes (or no voltage drop diodes in one, two or three of the lighting circuits), such that comparable overall voltage drops may be achieved in the individual lighting circuits. Above described benefits of providing the same current source throughout the lighting circuits may be extended to four lighting circuits.

It is also possible that the multi-color light unit comprises more than four lighting circuits. The further lighting circuit(s) may also be configured in the manner described above with respect to the third and fourth lighting circuits.

According to a further embodiment, the first color is red and the second, third and fourth colors are green, blue and white. A WRGB light unit with above described properties is achieved in this way.

Exemplary embodiments of the invention further include a passenger transport vehicle, such as an aircraft, a road vehicle, a ship or a rail car, comprising at least one multi-color light unit, as described in accordance with any of the embodiments above. Above modifications and advantages equally apply to the passenger transport vehicle, aircraft, road vehicle, ship or rail car.

BRIEF DESCRIPTION OF THE DRAWINGS

Embodiments of the invention are described in greater detail below with reference to a FIGURE, wherein:

FIG. 1 shows a circuit diagram of an exemplary embodiment of a multi-color light unit in accordance with the invention.

DETAILED DESCRIPTION

FIG. 1 shows a circuit diagram of a multi-color light unit 2 in accordance with an exemplary embodiment of the invention. FIG. 1 shows the components relevant for the electric behaviour of the multi-color light unit 2. As is apparent to the skilled person, the multi-color light unit 2 may have additional elements and structures. For example, the multi-color light unit may comprise a mounting structure, to which the electric elements are connected, such as a printed circuit board, and a housing, within which the electric components are disposed, as well as a lens cover, through which the LEDs emit light and which protects the electric elements from the environment. For an easier understanding of the invention, above discussed straight-forward additional elements are not shown in FIG. 1.

The multi-color light unit 2 has a power input terminal 4. In the present exemplary embodiment, the power input terminal 4 is an AC power terminal. As such, the power input terminal 4 may consist of a suitable number of connections, such as two or three or more connections, depending on the nature of the power input into the multi-color light unit. The power is supplied to the multi-color light unit 2 by a power source (not shown). In the example of the multi-color light unit 2 being an interior aircraft light, the power source may be the on board power supply network of the aircraft.

The multi-color light unit 2 further comprises a power conditioning module 6 and pair of DC terminal 8 and 8a, namely a joint power terminal 8 and a common ground terminal 8a. The power conditioning module 6 is interposed between the power input terminal 4 on the one side and the joint power terminal 8/common ground terminal 8a on the other side. The power conditioning module 6 transforms the incoming AC power into DC power. It provides a regulated DC voltage across between the joint power terminal 8 and the common ground terminal 8a.

The power conditioning module 6 may have various substructures. For example, the power conditioning module 6 may comprise a power factor correction circuit, which provides for an optimized power reception of the incoming AC power by the multi-color light unit 2. Further, the power conditioning module 6 may comprise a rectifier or AC/DC converter for transforming the incoming AC power into DC power. Further, the power conditioning module 6 may comprise a DC/DC converter that transforms the rectified DC voltage to a level that is desired to be present at the joint power terminal 8.

The joint power terminal 8 is coupled to four lighting circuits, namely a first lighting circuit 10, a second lighting circuit 20, a third lighting circuit 30 and a fourth lighting circuit 40. All of the first lighting circuit 10, the second lighting circuit 20, the third lighting circuit 30, and the fourth lighting circuit 40 are coupled between the joint power terminal 8 and the common ground terminal 8a.

Each lighting circuit comprises a current source, coupled to the joint voltage terminal 8. In particular, the first lighting circuit 10 comprises a first current source 12 coupled to the joint power terminal 8. The second lighting circuit 20 comprises a second current source 22 coupled to the joint power terminal 8. The third lighting circuit 30 comprises a third power source 32 coupled to the joint power terminal 8.

The fourth lighting circuit 40 comprises a fourth current source 42 coupled to the joint power terminal 8. In this way, the first to fourth current sources 12, 22, 32 and 42 are all coupled to the same voltage level and draw electric power from the external power supply via the joint power terminal 8.

All of the current sources are coupled to the joint power terminal 8 via a respective switch. In particular, the first current source 12 is coupled to the joint power terminal 8 via a first switch 18. The second current source 22 is coupled to the joint power terminal 8 via a second switch 28. The third current source 32 is coupled to the joint power terminal 8 via a third switch 38. The fourth current source 42 is coupled to the joint power terminal 8 via a fourth switch 48. The first to fourth switches 18, 28, 38 and 48 allow for selectively connecting the lighting circuits to the joint power terminal 8, such that individual lighting circuits may be switched on and off.

The first lighting circuit 10 comprises a diode string coupled between the first current source 12 and the common ground terminal 8a. In particular, the first lighting circuit 10 comprises a series connection of red LED's 14 and voltage drop diodes 16, which do not emit light. In particular, the first lighting circuit 10 comprises a series connection of an equal number of red LED's 14 and voltage drop diodes 16, which are connected in an alternating manner. In other words, a red LED 14 is followed by a voltage drop diode 16, which in turn is followed by a red LED 14 and a voltage drop diode 16, and so on. Overall, the first lighting circuit 10 may have a suitable number of such pairs of red LED's 14 and voltage drop diodes 16, depending on the desired illumination capacity. This number may be between 10 and 50, but may also have a fewer or larger number. In the exemplary embodiment of FIG. 1, the first lighting circuit 10 comprises 20 red LED's 14 and 20 voltage drop diodes 16. For an easier readability, only three of these diode pairs are depicted FIG. 1, with the dashed portion of the line indicating that a larger number of diodes is present.

The second lighting circuit 20 comprises a series connection of green LED's 24. In particular, the number of green LED's 24 is the same as the number of red LED's 14 in the exemplary embodiment of FIG. 1. The diode string between the second current source 22 and the common ground terminal 8a consists of green LED's 24 only. In other words, no voltage drop diodes or other circuit elements are arranged between the second current source 22 and the common ground terminal 8a.

The third lighting circuit 30 comprises a series connection of blue LED's 34. In particular, the number of blue LED's 34 is the same as the number of red LED's 14 in the exemplary embodiment of FIG. 1. The diode string between the third current source 32 and the common ground terminal 8a consists of blue LED's 34 only. In other words, no voltage drop diodes or other circuit elements are arranged between the third current source 32 and the common ground terminal 8a.

The fourth lighting circuit 40 comprises a series connection of white LED's 44. In particular, the number of white LED's 44 is the same as the number of red LED's 14 in the exemplary embodiment of FIG. 1. The diode string between the fourth current source 42 and the common ground terminal 8a consists of white LED's 44 only. In other words, no voltage drop diodes or other circuit elements are arranged between the fourth current source 42 and the common ground terminal 8a.

The first to fourth current sources 12, 22, 32 and 42 are equal in design. In other words, the four current sources have the same internal circuit structure. They all generate the same amount of current for their respective lighting circuit from the voltage provided at the joint power terminal 8.

The operation of the multi-color light unit 2 is described as follows. AC power is supplied to the multi-color light unit 2 by an external power source at the power input terminal 4. This AC power is transformed into a suitable DC power between the joint power terminal 8 and the common ground terminal 8a by the power conditioning module 6. For the further explanation, it is assumed that all four lighting circuits are in operation at the same time, i.e. that all four switches 18, 28, 38 and 48 are closed at the same time. It is apparent that other options are possible as well.

When all four lighting circuits are in operation, the first to fourth current sources 12, 22, 32 and 42 all provide the same current to the respective diode strings coupled to the respective current sources. As the applied voltage and the controlled current are the same for all four lighting circuits, each lighting circuit dissipates the same amount of power. In particular, the total power consumption among the four lighting circuits is four times the voltage between the joint power terminal 8 and the common ground terminal 8a, multiplied by the current generated by each of the current sources.

For each lighting circuit, the power dissipation is split up between the respective current source and the respective diode string. In particular, the overall voltage drop of the series connection of each diode string, multiplied by the current provided by the current source, is the power consumption of the respective diode string in the respective lighting circuit. The remainder of the power dissipation takes place in the respective current source.

As discussed above, the first to fourth lighting circuits 10, 20, 30 and 40 have the same number of red, green, blue and white LED's, respectively. In the exemplary embodiment of FIG. 1, the green, blue and white LED's have a forward voltage drop of 3.0 V. Assuming a series connection of 20 LED's per lighting circuit, the overall forward voltage drop of the green, blue and white LED's is 60 V, respectively.

The forward voltage drop of the red LED's 14 is 1.6 V in the exemplary embodiment of FIG. 1. The forward voltage drop of the voltage drop diodes 16 is 1.4 V in the exemplary embodiment of FIG. 1. In this way, the overall forward voltage drop of the red LED's 14 and the voltage drop diodes 16 is also 60 V in the exemplary embodiment of FIG. 1. In this way, the diode strings of the first to fourth lighting circuits 10, 20, 30 and 40 all have the same overall forward voltage drops and dissipate the same amount of electrical power.

It is pointed out that each of the voltage drop diodes with a forward voltage drop of 1.4 V may be replaced by a respective diode pair of diodes with a forward voltage drop of 0.7 V. Such diodes with a forward voltage drop of 0.7 V are very standard parts.

By providing four diode strings with similar or equal power dissipation, the first to fourth current sources 12, 22, 32 and 42 may be optimized for the given amount of DC voltage at the joint voltage terminal 8 and the given power dissipation in each of the diode strings of the respective lighting circuits. In the exemplary embodiment of FIG. 1, the first to fourth current sources 12, 22, 32 and 42 are optimized in such a way that they generate a minimum amount of waste heat. In this way, the localized heat generation in the current sources is minimized, resulting in reduced cooling constrains. As the current sources are all of equal design, their design, assembly, maintenance and control during operation is simplified. In particular, all of the current sources may be controlled in the same manner with respect to dimming.

As the first to fourth current sources 12, 22, 32 and 42 are linear current sources, they are simple in circuit structure, small in required space, easy to control for dimming, and cheap to produce. The overall circuit complexity, power consumption and space requirements are kept low, while avoiding localized heat generation peaks.

The control of the multi-color light unit 2 is carried out via external control commands. These control commands cause the first to fourth switches 18, 28, 38 and 48 to be open or closed, respectively, and cause the current produced by the current sources to be in accordance with a desired dimming level. In this way, a desired shade of a desired color with a desired dimming intensity may be requested and controlled via external control commands.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. A multi-color light unit comprising a plurality of lighting circuits, with each lighting circuit being coupled to a joint power terminal, the plurality of lighting circuits comprising:
   a first lighting circuit, comprising a first current source, coupled to the joint power terminal, a plurality of first LED's, in operation emitting light of a first color, and a plurality of voltage drop diodes, in operation not emitting light, the plurality of first LED's and the plurality of voltage drop diodes being coupled to the first current source, and
   a second lighting circuit, comprising a second current source, coupled to the joint power terminal, and a plurality of second LED's, in operation emitting light of a second color, the plurality of second LED's being coupled to the second current source,
   wherein each of the plurality of first LED's has a lower forward voltage drop than each of the plurality of second LED's and wherein the number of voltage drop diodes in the first lighting circuit is chosen in such a way that the joint forward voltage drop of the first LED's and the voltage drop diodes in the first lighting circuit in operation is between 80% and 120% of the joint forward voltage drop of the second LED's in the second lighting circuit in operation,
   wherein the first current source and the second current source are of equal design.

2. The multi-color light unit according to claim 1, wherein the plurality of first LED's and the plurality of voltage drop diodes of the first lighting circuit form a first series connection.

3. The multi-color light unit according to claim 2, wherein the plurality of second LED's of the second lighting circuit form a second series connection.

4. The multi-color light unit according to claim 1, wherein the second lighting circuit is free of voltage drop diodes, which in operation do not emit light.

5. The multi-color light unit according to claim 1, wherein the first color is red.

6. The multi-color light unit according to claim 1, wherein the second color is one of the group consisting of green, blue, white and amber white.

7. The multi-color light unit according to claim 1, wherein the number of voltage drop diodes in the first lighting circuit is chosen in such a way that the joint forward voltage drop of the first LED's and the voltage drop diodes in the first lighting circuit in operation is between 90% and 110% of the joint forward voltage drop of the second LED's in the second lighting circuit in operation.

8. The multi-color light unit according to claim 1, wherein the first current source and the second current source are linear current sources.

9. The multi-color light unit according to claim 1, wherein the number of first LED's is between 80% and 120% of the number of second LED's.

10. The multi-color light unit according to claim 9, wherein the number of first LED's is the same as the number of second LED's.

11. The multi-color light unit according to claim 1, further comprising a power input terminal connectible to an external power supply and a power conditioning module, the power conditioning module being coupled between the power input terminal and the joint power terminal.

12. The multi-color light unit according to claim 1, further comprising:
   a third lighting circuit, comprising a third current source, coupled to the joint power terminal, and a plurality of third LED's, in operation emitting light of a third color, the plurality of third LED's being coupled to the third current source,
   wherein the third current source is of equal design as the first and second current sources.

13. The multi-color light unit according to claim 12, wherein the first color is red and the second and third colors are green and blue or wherein the first color is red and the second and third colors are white and amber white.

14. The multi-color light unit according to claim 11, further comprising:
   a fourth lighting circuit, comprising a fourth current source, coupled to the joint power terminal, and a plurality of fourth LED's, in operation emitting light of a fourth color, the plurality of fourth LED's being coupled to the fourth current source,
   wherein the fourth current source is of equal design as the first, second and third current sources.

15. The multi-color light unit according to claim 14, wherein the first color is red and the second, third and fourth colors are green, blue and white.

16. A passenger transport vehicle, such as an aircraft, a road vehicle, a ship or a rail car, comprising at least one multi-color light unit according to claim 1 disposed in the interior of the passenger transport vehicle.

\* \* \* \* \*